Reissued May 27, 1930 Re. 17,682

UNITED STATES PATENT OFFICE

ROWLAND D. SMITH, OF CORNING, NEW YORK, ASSIGNOR TO CORNING GLASS WORKS, OF CORNING, NEW YORK, A CORPORATION OF NEW YORK

FROSTING GLASS ARTICLES

No Drawing. Original No. 1,740,376, dated December 17, 1929. Serial No. 279,202, filed May 19, 1928. Application for reissue filed March 31, 1930. Serial No. 440,650.

This invention relates to the art of frosting glass articles, and more particularly to an improvement in the frosting solutions.

In prior methods of frosting glass articles, such as bulbs to be used in the manufacture of incandescent lamps, it has been customary to subject these articles to a frosting solution containing hydrofluoric acid and salts of this acid to provide the article with a light diffusing surface, and to then subject the article to the action of a fortifying solution containing a weaker fluoride solution to strengthen it.

In the preparation of such frosting solutions it has been customary to use ordinary raw materials in the form of a thick slurry, after grinding and mixing them, but I have discovered that a much less expensive and more efficient frosting solution can be obtained by fusing certain of the raw materials prior to their incorporation into the frosting solution.

It is therefore an object of this invention to provide a cheaper and more efficient frosting solution.

In the preferred form of my invention the batch for the frosting solution contains

| | Pounds |
|---|---|
| Soda ash, $Na_2CO_3$ | 15 |
| Ammonium carbonate, $(NH_4)_2CO_3$ | 30 |
| Sodium fluoride, NaF | 11 |
| Hydrofluoric acid, HF (60%) | 135 |
| Ammonium bifluoride, $NH_4F.HF$ | 168 |
| Water | 109 |

and this batch gives a resulting frosting solution consisting of

| | Per cent |
|---|---|
| Hydrofluoric acid, HF (100%) | 27.8 |
| Ammonium fluoride, $NH_4F$ | 28.9 |
| Water, $H_2O$ | 38.0 |
| Sodium fluoride, NaF | 5.3 |

This frosting solution is preferably made in the following manner. The sodium fluoride and the soda ash are fused separately, and then ground separately to the desired degree of fineness. 15 pounds of soda ash is then mixed with 30 pounds of ammonium carbonate, 37 pounds of water, 90 pounds of 60% hydrofluoric acid and 69 pounds of ammonium bifluoride to form one part of the batch. 11 pounds of sodium fluoride is mixed with 72 pounds of water, 45 pounds of 60% hydrofluoric acid and 99 pounds of ammonium bifluoride, preferably in a rubber lined ball mill, to form a second part of the batch, and equal quantities of these two parts are then blended to form the frosting solution.

The previous fusing of the sodium fluoride and soda ash results in the production of a more dense slurry which occupies less volume in the solution and therefore gives a thinner or more watery solution. Inasmuch as some of the frosting solution always adheres to the inside of the article being frosted, the thinner this solution can be made without changing its strength the less will be consumed per article frosted, and I have found that my improvement results in a saving in material cost of approximately 25 per cent.

As a special improvement in the frosting produced by my invention I will mention the fact that it produces a perfectly even frosting and minimizes the deleterious effect of colloidal frosting material in the batch which produces a different localized frost pattern on the articles being frosted.

It will therefore be apparent that by the use of my invention the cost of frosting solutions can be decreased materially without sacrificing their efficiency, and that this highly desirable result is accomplished by the simple expedient of fusing certain of the raw materials, which results in the production of a thinner slurry that does not carry away as much of the frosting solution and hence avoids wastage.

It will also be apparent that my invention is not limited to the fusing of the particular sodium and fluorine compounds set forth above, but that it is applicable to the fusing of other salts when batches of different composition are to be made.

I also desire to have it understood that the use of fused sodium fluoride and ordinary soda ash or the use of fused soda ash and ordinary sodium fluoride is better than the use of ordinary sodium fluoride and ordinary soda ash, and that the use of part fused sodium fluoride and part ordinary sodium fluoride, or part fused soda ash and part ordinary soda ash is better than the use of all ordinary sodium fluoride or all ordinary soda ash, as the use of small amounts of these fused materials is beneficial and reduces the cost, but I have found that the advantages of better and cheaper frosting are proportional to the percentage of the fused materials used in the batch. I therefore do not wish to be limited to the use of both fused sodium fluoride and fused soda ash, or to the fusion of the entire amount of these materials used in the batch, except as indicated by the scope of the following claims.

As an example of a modified batch to which my invention is applicable, I mention the following:

| | Pounds |
|---|---|
| Soda ash, $Na_2CO_3$ | 18¼ |
| Ammonium carbonate, $(NH_4)_2CO_3$ | 36 |
| Hydrofluoric acid, HF (60%) | 108 |
| Ammonium bifluoride, $NH_4F.HF$ | 84 |
| Water | 43½ |
| Potassium fluoride, KF | 2 |

In the preparation of a batch of this composition, part of the soda ash is fused and ground to the desired degree of fineness This is then ground together with the balance of the soda ash and the ammonium carbonate to form one part of the batch. The water, hydrofluoric acid, and ammonium bifluoride are stirred together to form a second part of the batch, the ground carbonates are added to this with stirring, and then the potassium fluoride is stirred in. While various mixtures of fused and unfused soda ash may be used, a suitable mixture consists of 10¼ parts of fused soda ash and 8 parts of unfused soda ash.

I claim:

1. The method of preparing a frosting solution which consists in fusing a salt of an alkali metal of the first periodic group having an atomic weight between 22 and 40, grinding the fused material to the desired degree of fineness and then mixing it with proper batch materials to form a frosting solution.

2. The method of preparing a frosting solution which consists in fusing a sodium salt, grinding the fused material to the desired degree of fineness and then mixing it with proper batch materials to form the frosting solution.

3. The method of preparing a frosting solution which consists in fusing sodium fluoride and soda ash separately, grinding these separately to the desired degree of fineness and then mixing them with proper batch materials to form the frosting solution.

4. The method of preparing a frosting solution which consists in fusing sodium fluoride and soda ash separately, grinding these separately to the desired degree of fineness, and then mixing them with ammonium carbonate, hydrofluoric acid, ammonium bifluoride, and water to form the frosting solution.

5. The method of preparing a frosting solution which consists in fusing sodium fluoride and soda ash separately, grinding these separately to the desired degree of fineness, then mixing the soda ash with ammonium carbonate and part of the water, hydrofluoric acid and ammonium bifluoride to form one part of the batch, mixing the sodium fluoride with the balance of the water, hydrofluoric acid and ammonium bifluoride, to form a second part of the batch, and blending these two portions to form the frosting solution.

6. The method of preparing a frosting solution which consists in fusing sodium fluoride and soda ash separately, grinding these separately to the desired degree of fineness, then mixing the soda ash with ammonium carbonate and part of the water, hydrofluoric acid and ammonium bifluoride to form one part of the batch, mixing the sodium fluoride with the balance of the water, hydrofluoric acid and ammonium bifluoride, to form a second part of the batch, and blending equal quantities of these two portions to form the frosting solution.

7. The method of preparing a frosting solution which consists in fusing sodium fluoride and soda ash separately, grinding these separately to the desired degree of fineness, then mixing 15 pounds of soda ash with 30 pounds of ammonium carbonate, 37 pounds of water, 90 pounds of 60% hydrofluoric acid, and 69 pounds of ammonium bifluoride to form one part of the batch, mixing 11 pounds of sodium fluoride with 72 pounds of water, 45 pounds of 60% hydrofluoric acid, and 99 pounds of ammonium bifluoride, to form a second part of the batch, and blending these two parts to form the frosting solution.

8. The method of preparing a frosting solution which consists in fusing sodium fluoride and soda ash separately, grinding these separately to the desired degree of fineness, then mixing 15 pounds of soda ash with 30 pounds of ammonium carbonate, 37 pounds of water, 90 pounds of 60% hydrofluoric acid and 69 pounds of ammonium bifluoride to form one part of the batch, mixing 11 pounds of sodium fluoride with 72 pounds of water, 45 pounds of 60% hydrofluoric acid and 99 pounds of ammonium bifluoride, to form a second part of the batch, and blending equal quantities of these two parts to form the frosting solution.

9. A batch for a frosting solution containing a fused salt of an alkali metal of the first periodic group having an atomic weight between 22 and 40.

10. A batch for a frosting solution containing a fused sodium salt.

11. A batch for a frosting solution containing fused sodium fluoride and fused soda ash.

12. A batch for a frosting solution containing fused sodium fluoride and fused soda ash, the resulting solution having the following anaylsis: 27.8% of 100% hydrofluoric acid, 29.9% of ammonium fluoride, 38% of water, and 5.3% of sodium fluoride.

ROWLAND D. SMITH.